United States Patent
Stevens

(10) Patent No.: US 7,827,320 B1
(45) Date of Patent: Nov. 2, 2010

(54) SERIAL ATA DEVICE IMPLEMENTING INTRA-COMMAND PROCESSING BY DETECTING XRDY PRIMITIVE WHILE IN THE XRDY STATE

(75) Inventor: Curtis E. Stevens, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 214 days.

(21) Appl. No.: 12/058,572

(22) Filed: Mar. 28, 2008

(51) Int. Cl.
*G06F 3/00* (2006.01)

(52) U.S. Cl. .......................... 710/5; 712/225; 712/405

(58) Field of Classification Search .............. 710/5
See application file for complete search history.

(56) References Cited

U.S. PATENT DOCUMENTS

| | | | |
|---|---|---|---|
| 4,703,420 A | 10/1987 | Irwin | |
| 5,077,733 A | 12/1991 | Whipple | |
| 5,276,662 A | 1/1994 | Shaver, Jr. et al. | |
| 5,465,338 A | 11/1995 | Clay | |
| 5,590,299 A | 12/1996 | Bennett | |
| 5,860,089 A * | 1/1999 | Ishii | 711/112 |
| 6,618,788 B1 | 9/2003 | Jacobs | |
| 6,697,885 B1 | 2/2004 | Goodfellow | |
| 6,948,082 B2 | 9/2005 | Gschwind et al. | |
| 6,948,113 B1 | 9/2005 | Shaver | |
| 7,130,932 B1 | 10/2006 | Ghaffari | |
| 7,165,124 B2 | 1/2007 | Fujita et al. | |
| 2003/0236953 A1 | 12/2003 | Grieff et al. | |
| 2004/0010625 A1 * | 1/2004 | Lo et al. | 709/250 |
| 2004/0190554 A1 | 9/2004 | Galloway | |
| 2005/0027894 A1 | 2/2005 | Ayyavu | |
| 2005/0027913 A1 | 2/2005 | Boecker | |
| 2005/0080842 A1 | 4/2005 | Takeuchi | |
| 2005/0102468 A1 * | 5/2005 | Delaney et al. | 711/114 |
| 2005/0122991 A1 | 6/2005 | Golasky et al. | |
| 2005/0186832 A1 | 8/2005 | Nemazie | |
| 2006/0031612 A1 | 2/2006 | Bashford et al. | |
| 2006/0075164 A1 * | 4/2006 | Ooi | 710/58 |
| 2006/0248535 A1 | 11/2006 | Grover | |
| 2007/0118768 A1 | 5/2007 | Wolford | |
| 2007/0189619 A1 | 8/2007 | Liu et al. | |
| 2007/0226385 A1 * | 9/2007 | Liu et al. | 710/62 |
| 2007/0260756 A1 * | 11/2007 | Tseng et al. | 710/5 |
| 2008/0005398 A1 | 1/2008 | Huffman | |

OTHER PUBLICATIONS

Serial ATA: High Speed Serialized AT Attachment, Revision 1.0a, Jan. 7, 2003, pp. 1-311.

(Continued)

*Primary Examiner*—Henry W Tsai
*Assistant Examiner*—Elias Mamo

(57) ABSTRACT

A Serial Advanced Technology Attachment (SATA) device for communicating with a host is disclosed. The SATA device comprises control circuitry which enters a XRDY state in preparation for sending data to the host, receives a first XRDY from the host while in the XRDY state, and sets a RXRDY flag. After receiving the first XRDY, the control circuitry receives a RRDY from the host while in the XRDY state, transmits a data block to the host in response to the RRDY, and enters an idle state after transmitting the data block to the host. If the RXRDY flag is set while in the idle state, the control circuitry waits for the host to transmit a second XRDY.

11 Claims, 4 Drawing Sheets

OTHER PUBLICATIONS

Serial ATA International Organization: Serial ATA Revision 2.6, High Speed Serialized AT Attachment, Feb. 15, 2007, 600 pages.

American National Standard for Information Technology, AT Attachment with Packet Interface 7, vol. 3, Serial Transport Protocols and Physical Interconnect (ATA/ATAPI-7 V3), ANSI INCITS 397-2005 (vol. 3), 305 pages.

American National Standard for Information Technology, AT Attachment with Packet Interface 7, vol. 2, Parallel Transport Protocols and Physical Interconnect (ATA/ATAPI-7 V2), ANSI INCITS 397-2005 (vol. 2), 250 pages.

American National Standard for Information Technology, AT Attachment with Packet Interface 7, vol. 1, Register Delivered Command Set, Logical Register Set (ATA/ATAPI-7 V1), ANSI INCITS 397-2005 (vol. 1), 393 pages.

Office Action dated Jan. 13, 2010 from U.S. Appl. No. 12/058,601, 25 pages.

Office Action dated Jul. 7, 2010 from U.S. Appl. No. 12/058,601, 19 pages.

* cited by examiner

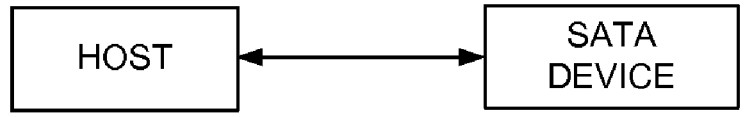
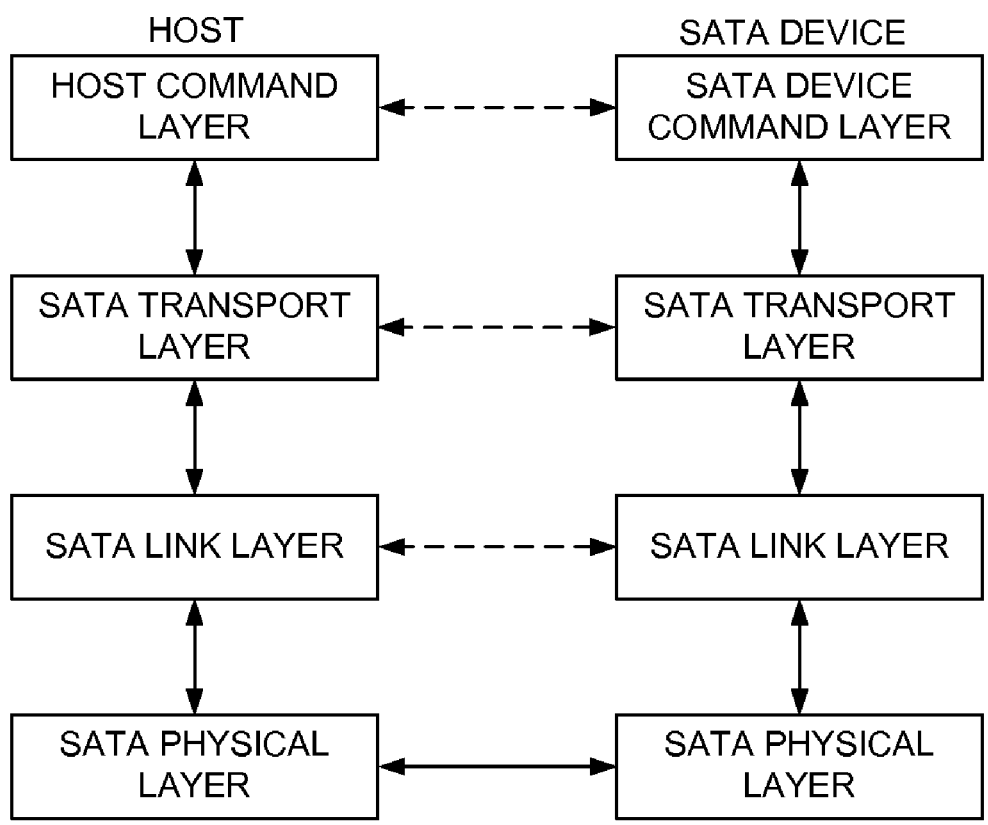
FIG. 1A
(Prior Art)
FIG. 1B
(Prior Art)

SERIAL ATA DEVICE IMPLEMENTING INTRA-COMMAND PROCESSING BY DETECTING XRDY PRIMITIVE WHILE IN THE XRDY STATE

BACKGROUND

Serial Advanced Technology Attachment (SATA) devices, such as disk drives and Flash drives, communicate with a host using the SATA protocol. To implement a large read command, the SATA device typically transmits the requested data to the host in multiple blocks (e.g., 8 k blocks). The prior art has suggested to insert a delay between each block transfer to allow the host to send intra-command data to the SATA device. However, inserting a delay between each block transfer can significantly degrade the performance (throughput) of the SATA device.

BRIEF DESCRIPTION OF THE DRAWINGS

FIG. 1A shows a prior art SATA device for communicating with a host.

FIG. 1B shows prior art SATA communication layers implemented by both the host and a SATA device.

DETAILED DESCRIPTION OF EMBODIMENTS OF THE INVENTION

Figure 2:
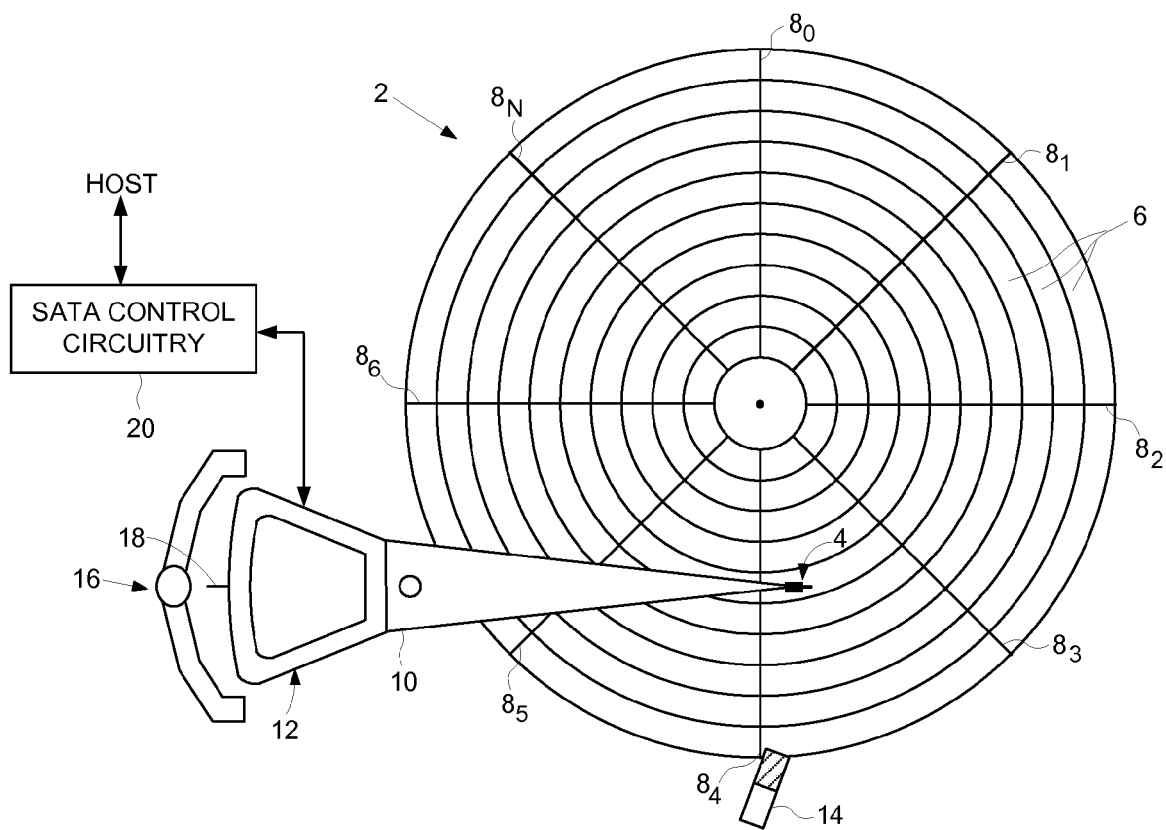
FIG. 2 shows a SATA device in the form of a disk drive comprising SATA control circuitry.

FIG. 1A shows a host communicating with a SATA (SATA) device, such as a disk drive (fixed or removable media), Flash drive, optical drive (CD ROM, DVD, Blue Ray), etc. FIG. 2 shows an embodiment of the present invention wherein the SATA device comprises a disk drive including a disk 2, and a head 4 actuated over the disk 2. The disk 2 comprises a plurality of tracks 6 defined by embedded servo sectors $8_0$-$8_N$. The head 4 is connected to a distal end of an actuator arm 10 which is rotated about a pivot by a voice coil motor. The voice coil motor is comprised of a voice coil 12 coupled to the base of the actuator arm 10 which interacts with permanent magnets of a yoke (not shown). During certain modes of operation, such as when the disk drive is about to power down, the actuator arm 10 is rotated in order to unload the actuator arm 10 onto a ramp 14 near the outer periphery of the disk 2. A crash stop 16 limits the stroke of the actuator arm 10 by limiting the movement of a tang 18 coupled to the base of the actuator arm 10. SATA control circuitry 20 communicates with a host using a suitable SATA communication protocol.

The conventional specifications for SATA communication protocols are maintained by the Serial ATA International Organization (SATA-IO) and made available on the Internet. FIG. 1B shows the conventional SATA communication layers including the Command layer (or Application layer), the Transport layer, the Link layer, and the Physical layer. The Control layer interacts with the Transport layer through a register interface that is equivalent to a traditional Parallel ATA host adapter. A shadow register block is defined that is both compatible with Parallel ATA and anticipated future extensions. Software is thus backward compatible with Parallel ATA devices. The Transport layer handles the packing and unpacking of ATA and ATAPI information into Frame Information Structures (FISs). The Transport layer also manages the FIFO or buffer memory for controlling data flow. The Link layer transmits and receives frames, transmits primitives based on control signals from the Transport layer, and receives primitives from the Physical layer which are converted to control signals to the Transport layer. The Physical layer incorporates serializer/deserializer, provides out of band (OOB) signaling, and handles power-on sequencing and speed negotiation. Device status feedback is also provided to the Link layer.

Figure 3A:
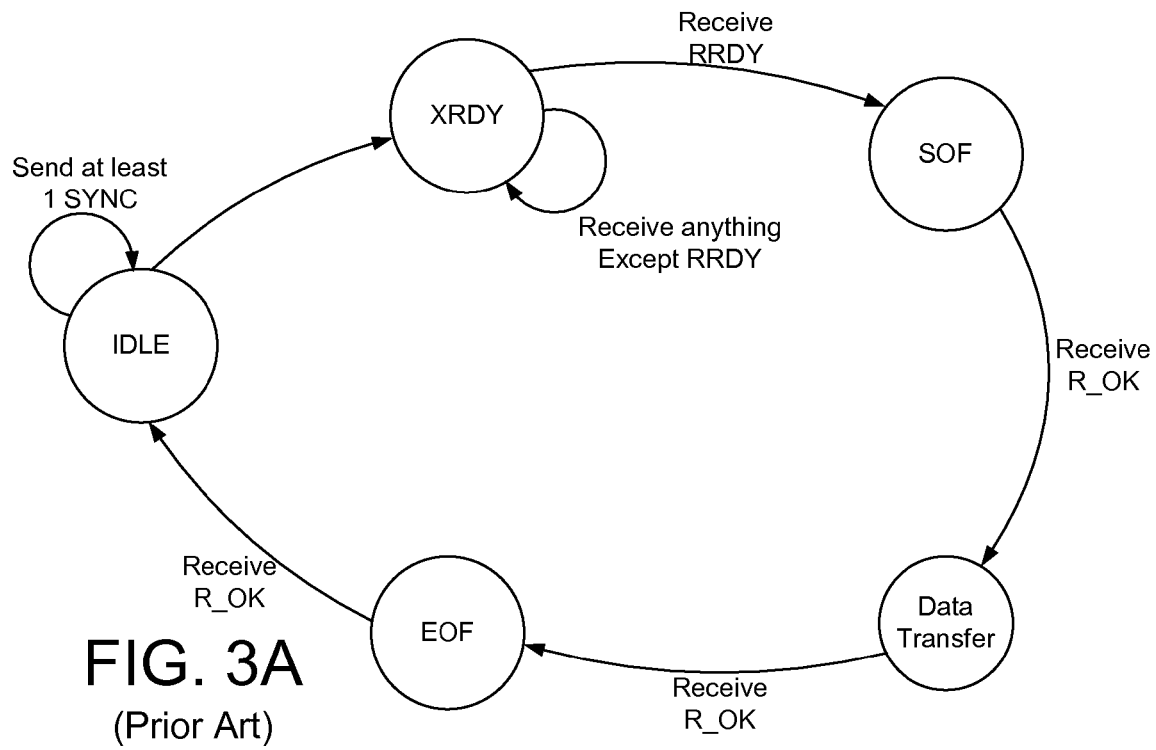
FIG. 3A shows a prior art state transition diagram implemented by the SATA device for transmitting data to the host (during a read operation) wherein the host is not able to send a XRDY to the SATA device after it enters the XRDY state.

FIG. 3A shows a prior art state transition diagram implemented by the conventional SATA Link layer when transmitting multiple data FISs to the host in response to a read command. The SATA device enters the XRDY state and waits for the host to transmit a RRDY primitive indicating that the host is ready to receive more data. The SATA device then enters the SOF state to transfer a start of frame (SOF) primitive to the host. After receiving an R_OK primitive from the host, the SATA device transmits a data FIS to the host, and after receiving an R_OK primitive from the host, the SATA device enters the EOF state to transfer and end of frame (EOF) primitive to the host. After receiving an R_OK primitive from the host, the SATA device enters an IDLE state where it sends at least one SYNC primitive to the host to maintain synchronization, and then transitions back to the XRDY state where the process repeats for the next block of data for the current command.

While the SATA device is in the XRDY state waiting to receive a RRDY primitive from the host, the SATA device will ignore a XRDY primitive received from the host (a request to transmit data to the SATA device) since the SATA device is already busy processing the current read command. Therefore, the host typically cannot send intra-command data to the SATA device (for example, to command a disk drive to unload an actuator arm 10 onto a ramp 14 to avoid damage due to a free fall event).

Figure 3B:
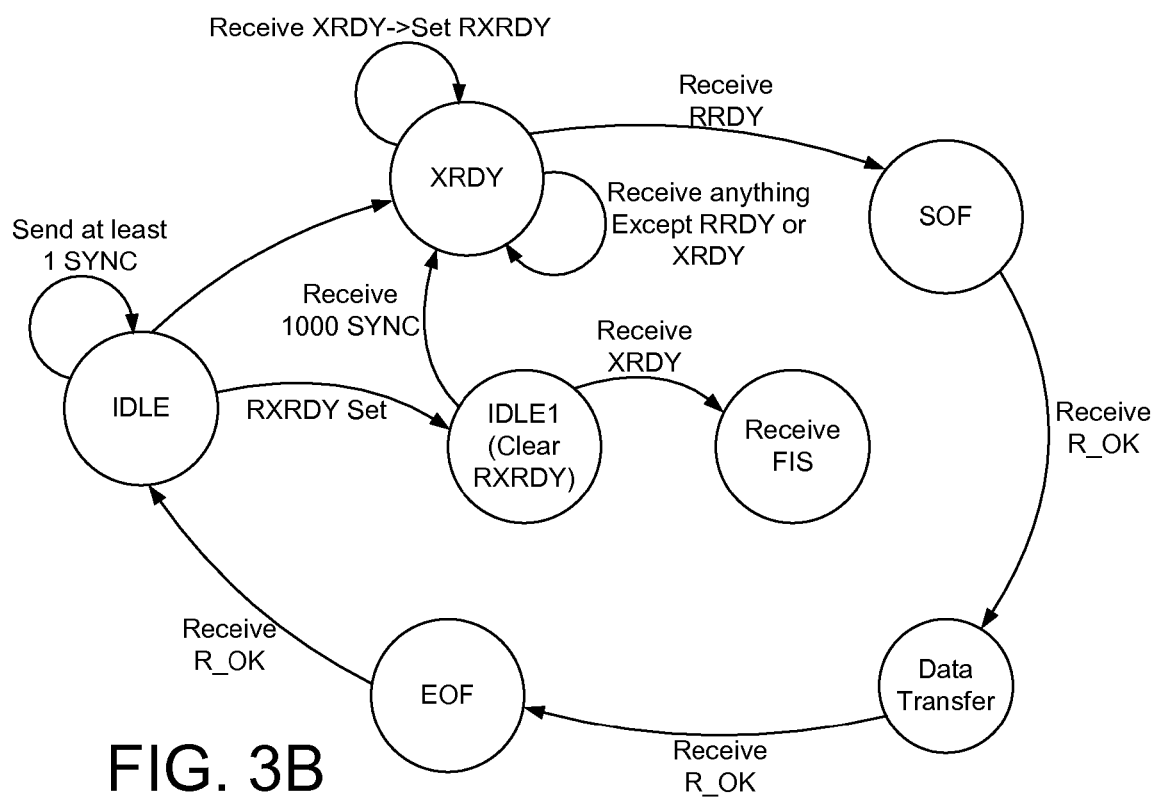
FIG. 3B shows a state transition diagram implemented by the SATA device according to an embodiment of the present invention wherein the SATA device sets a RXRDY flag if a XRDY is received from the host while in the XRDY state which enables the host to transmit a Frame Information Structure (FIS) to the SATA device after entering the IDLE state.

FIG. 3B shows a state transition according to an embodiment of the present invention when transmitting multiple data FISs to the host in response to a read command. The state transition diagram of FIG. 3B differs from the state transition diagram of FIG. 3A in that when the SATA device is in the XRDY state and receives a XRDY primitive from the host, the SATA device sets a RXRDY flag to identify the collision. Than after the SATA device sends the next FIS to the host (in response to the RRDY primitive), when the SATA device enters the IDLE state it checks whether the RXRDY flag was set. If so, the SATA device enters a secondary idle state (IDLE1), clears the RXRDY flag, and waits for the host to transmit another XRDY primitive. If the SATA device receives a XRDY primitive while in the IDLE1 state, the SATA device transitions into a receive FIS state and receives and processes a FIS from the host containing intra-command data (e.g., a free fall event detected). If the host does not transmit an XRDY to the SATA device, the SATA device transitions into the XRDY state in order to continue processing the current read command. In one embodiment, the SATA device waits for a predetermined interval while in the IDLE1 state, and in another embodiment, the SATA device waits to receive a predetermined number of SYNC primitives from the host before transitioning back into the XRDY state.

Although the state transition diagram of FIG. 3B illustrates a read command, the embodiments of the present invention apply to any command executed by the SATA device, such as a write command or a feature set command, or any other command wherein the SATA device may be busy such that host would not typically be able to transmit intra-command data to the SATA device. In addition, the intra-command data transmitted by the host may comprise any suitable data, wherein in one embodiment the intra-command data comprises an interim access command (read or write command) that is executed prior to completing the current access command.

Figure 4:
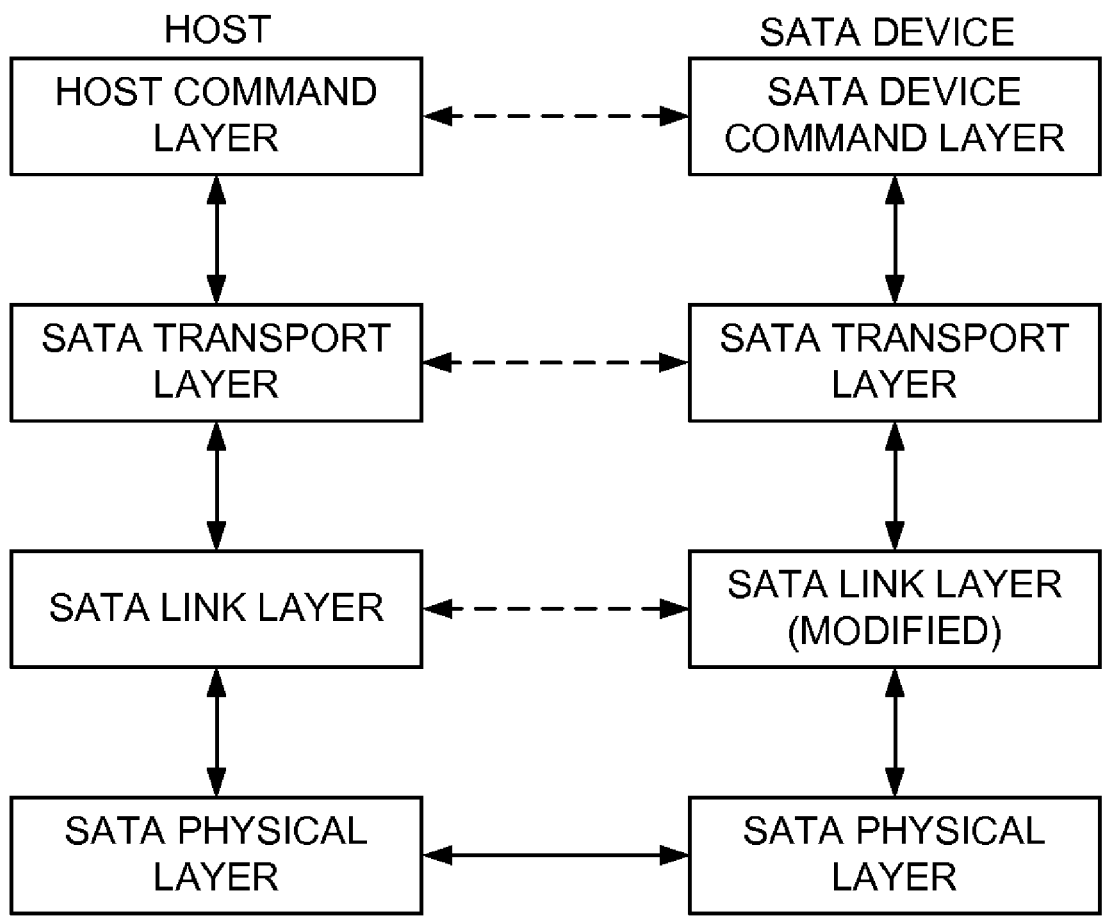
FIG. 4 shows an embodiment of the present invention wherein the link layer of a SATA device is modified to implement the state transition diagram of FIG. 3B.

FIG. 4 shows an embodiment of the present invention wherein the Link layer of a SATA device is modified in order to implement the intra-command data processing, such as the state transition diagram shown in FIG. 3B. The Link layer is typically responsible for processing the primitives received from the host, including the XRDY primitive. Therefore, in one embodiment the Link layer is modified to set the RXRDY flag while in a suitable state, such as the XRDY state of FIG. 3B, and then to check the status of the RXRDY flag while in a suitable state, such as the IDLE state of FIG. 3B.

The control circuitry for implementing the embodiments of the present invention within a SATA device may comprise any suitable circuitry, such as any suitable integrated circuit or circuits, a microprocessor executing instructions of a control program, etc. In the embodiment where the control circuitry is implemented within a disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to implement the embodiments described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk of a disk drive and read into a volatile semiconductor memory when the disk drive is powered on.

What is claimed is:

1. A Serial Advanced Technology Attachment (SATA) device for communicating with a host, the SATA device comprising control circuitry operable to:
    enter a Transmit Ready (XRDY) state in preparation for sending data to the host;
    receive a first XRDY from the host while in the XRDY state and set a Receive/Transmit ready (RXRDY) flag;
    after receiving the first XRDY, receive a Receive Ready (RRDY) from the host while in the XRDY state;
    transmit a data block to the host in response to the RRDY;
    enter an idle state after transmitting the data block to the host; and
    if the RXRDY flag is set while in the idle state, wait for the host to transmit a second XRDY,
    receive the second XRDY while in the idle state; and
    after receiving the second XRDY, receive a Frame Information Structure from the host comprising intra-command data.

2. The SATA device as recited in claim 1, wherein waiting for the host to transmit the second XRDY comprises waiting for a predetermined time interval.

3. The SATA device as recited in claim 1, wherein waiting for the host to transmit the second XRDY comprises waiting for a predetermined number of syncs to be received from the host.

4. The SATA device as recited in claim 1, wherein the control circuitry is further operable to clear the RXRDY flag while in the idle state.

5. The SATA device as recited in claim 1, wherein the control circuitry is further operable to enter the XRDY state when the second XRDY has not been received from the host.

6. The SATA device as recited in claim 1, wherein the SATA device comprises a disk drive.

7. A method of a Serial Advanced Technology Attachment (SATA) device communicating with a host, the method comprising:
    entering a Transmit Ready (XRDY) state in preparation for sending data to the host;
    receiving a first XRDY from the host while in the XRDY state and setting a Receive/Transmit ready (RXRDY) flag;
    after receiving the first XRDY, receiving a Receive Ready (RRDY) from the host while in the XRDY state;
    transmitting a data block to the host in response to the RRDY;
    entering an idle state after transmitting the data block to the host; and
    if the RXRDY flag is set while in the idle state, waiting for the host to transmit a second XRDY;
    receiving the second XRDY while in the idle state; and
    after receiving the second XRDY, receiving a Frame Information Structure from the host comprising intra-command data.

8. The method as recited in claim 7, wherein waiting for the host to transmit the second XRDY comprises waiting for a predetermined time interval.

9. The method as recited in claim 7, wherein waiting for the host to transmit the second XRDY comprises waiting for a predetermined number of syncs to be received from the host.

10. The method as recited in claim 7, further comprising clearing the RXRDY flag while in the idle state.

11. The method as recited in claim 7, further comprising entering the XRDY state when the second XRDY has not been received from the host.

* * * * *